April 12, 1966  G. M. STEIN  3,246,270
GRADED INSULATION FOR INTERLEAVED WINDINGS
Filed Sept. 10, 1962

WITNESSES

INVENTOR
Gerhard M. Stein
BY
ATTORNEY

April 12, 1966

G. M. STEIN 3,246,270

GRADED INSULATION FOR INTERLEAVED WINDINGS

Filed Sept. 10, 1962

April 12, 1966  G. M. STEIN  3,246,270
GRADED INSULATION FOR INTERLEAVED WINDINGS
Filed Sept. 10, 1962  5 Sheets-Sheet 3
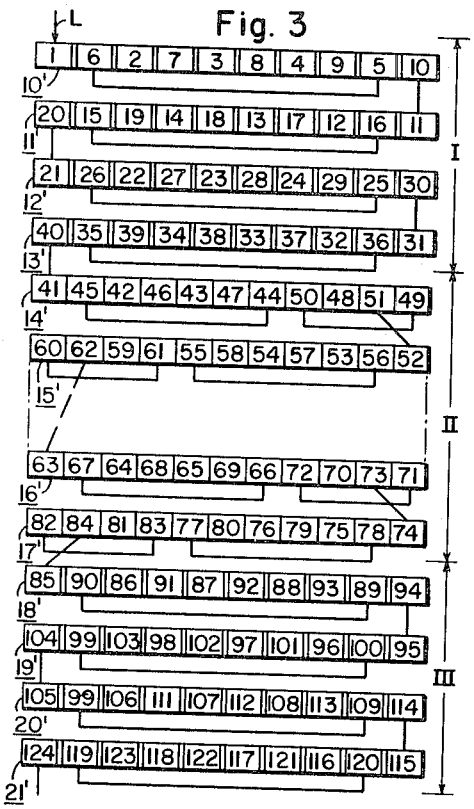
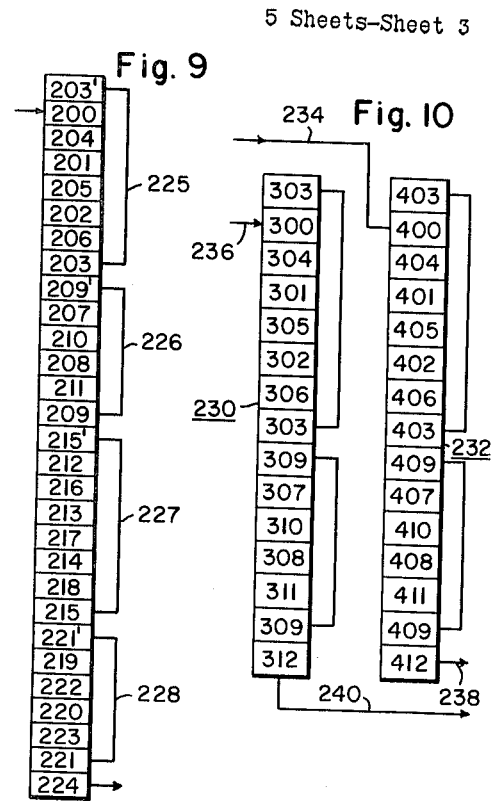
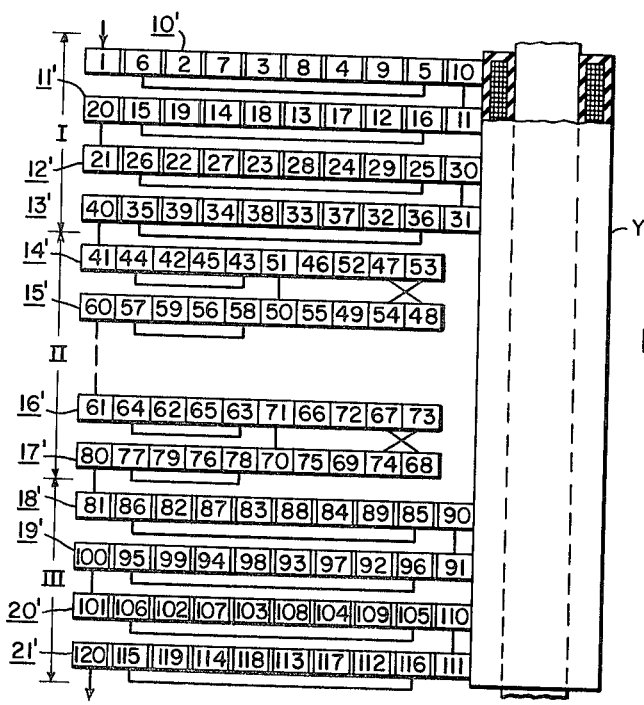

April 12, 1966        G. M. STEIN        3,246,270
GRADED INSULATION FOR INTERLEAVED WINDINGS
Filed Sept. 10, 1962        5 Sheets-Sheet 4

United States Patent Office 3,246,270
Patented Apr. 12, 1966

3,246,270
GRADED INSULATION FOR INTERLEAVED WINDINGS
Gerhard M. Stein, Sharon, Pa., assignor to Westinghouse Electric Corporation, East Pittsburgh, Pa., a corporation of Pennsylvania
Filed Sept. 10, 1962, Ser. No. 222,559
10 Claims. (Cl. 336—70)

This invention relates in general to windings for stationary inductive apparatus, such as transformers, and more particularly to windings well known in the art as interleaved pancake windings. Interleaved pancake windings are windings in which a number of conductor turns are connected in electrical series between physically adjacent conductor turns.

When a voltage surge wave, from a lightning stroke or other source, enters the winding of an inductive apparatus, the initial surge voltage distribution in the winding is determined primarily by the distributed shunt and series capacitances of the winding rather than by the inductance of the winding. These initial surge voltage stresses in a pancake winding are concentrated mostly at the line end of the winding, where the surge wave first strikes, and attenuate rapidly toward the interior of the winding. This non-linear voltage distribution applies to the voltages between winding and ground as well as to the voltages per pancake. It is a major problem to select the type of winding and in particular the type of interleaving to keep the total insulation space required to withstand these voltages to a minimum. In addition to this, in the prior art, little advantage has been taken of the non-uniformity in the stress voltage distribution by grading the insulation to match the voltage stress, that is by reducing the insulation in the interior of the winding, as compared with the insulation at the line end.

Such a graded insulation, if used alone, has limitations. If a reduction of the insulation in the interior of the winding includes a decrease of the spacing of the conductors in this art of the winding, the capacitance between turns, which represents the bulk of the series capacitance in an interleaved winding, is materially increased in the interior of the winding. This also increases the distributed series capacitance per unit winding length or what I shall refer to as the specific series capacitance in the interior of the winding and thus makes the specific series capacitance at the line end smaller by comparison.

The surge voltage stresses between pancakes connected in series and between series connected turns vary inversely with the specific series capacitance of the pancakes or turns so that these surge voltage stresses will tend even more to be concentrated at the line end. Furthermore, the change in the specific series capacitance in one part of the coil in relation to another part of the coil may give rise to voltage oscillations with concomitant stresses in the winding. These effects are particularly pronounced in the well known pancake windings where the electric coupling between different parts of the coil is usually smaller than in most other windings.

Accordingly, it is the general object of this invention to provide a new and improved winding for electrical inductive apparatus.

It is a more particular object of this invention to provide a new and improved winding for electrical inductive apparatus of the interleaved pancake type.

It is yet another object of the invention to provide a graded insulation interleaved pancake winding for electrical inductive apparatus which will have a minimum variation in the specific series capacitance from the line end to the interior of the winding.

Briefly, the present invention accomplishes the above cited objects by providing interleaved pancake windings with various degrees of interleaving so that the degree of interleaving can be selected to match the prevailing voltage stresses and the type of insulation used. In an embodiment of the invention with insulation grading, the interleaved winding is divided into several parts or zones with different insulation spacings. In a number of embodiments of the invention, particularly adapted to ungrounded windings, the winding is divided into three zones comprising two line ends and a central part of the winding. In many embodiments of the invention the central part of the winding is made the largest of the three parts. In one embodiment of the invention the central zone was made eight times larger than the line end zones. In another embodiment of the invention the central zone is confined to the tapped out part of the winding. In all embodiments of the invention, where an ungrounded winding is divided into three parts, the central part of the winding is constructed with reduced insulation thickness, including a reduced spacing between turns, as compared with the other two parts. The decrease in the thickness of the turn to turn insulation in the central part of the winding will also permit an increase in the number of turns per pancake in the central portion of the winding. It is well known that interleaving of conductor turns effectively puts the turn to turn capacitances in parallel making for a high series capacitance winding and that an increase of the number of turns per pancake increases the specific series capacitance. I have found that by increasing the number of interleavings of a certain part of the windings, that is by decreasing the degree of interleaving or reducing the number of turns in electrical series between physically adjacent turns I can obtain a decrease in the specific series capacitance and voltage stress between turns in that part of the winding. The tendency of graded insulation to increase the distributed series capacitance in the central portion of the winding by decreasing the spacing of the turns and increasing the number of turns per pancake can be offset, according to the teachings of my invention, by decreasing the degree of interleaving in the pancakes of the central portion of the winding. As a result, a uniform distributed series capacitance can be obtained in all portions of the winding, that is the specific series capacitance of the central part of the winding is made essentially the same as that of the two end parts of the winding, despite the use of a reduced turn to turn insulation and an increased number of turns per pancake in the central portion of the winding. Consequently, the distribution of the surge voltages per pancake remains essentially the same as in a corresponding ungraded winding. As mentioned previously, the surge voltage stresses per pancake are much smaller in the interior of the winding, as compared with the line end. This decrease in the pancake surge voltage stress permits a reduction of the spacing between interior pancakes and between the turns of interior pancakes. The decrease of the degree of interleaving in the central part of a winding with this graded insulation reduces the turn to turn surge voltage stress in the central part, as compared with the turn to turn surge voltage stress at the same location of a corresponding ungraded winding. This permits a reduction in the turn to turn insulation thickness in the central part of the graded winding of much more than is indicated by the inherent reduction of the pancake surge voltage in this part of the winding, as compared with the line ends. In one embodiment of the invention the turn to turn spacing in the central zone of the winding was reduced by a ratio greater than 2:1, as compared with the spacing in the other two zones. The two end portions of an ungrounded winding are wound with the full thickness of the insulation and with the full interleaving necessary to withstand the surge voltages which, as previously mentioned, tend to concentrate in the turns near the line ends of the winding. If one end of the winding is to be grounded, only one zone near the line end needs to be wound with full thick insulation and full interleaving. In this embodiment of the invention the winding is divided into two zones, a fully insulated and fully interleaved zone adjacent to the line end and a reduced insulated zone with a reduced degree of interleaving adjacent to the ground.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGS. 3 and 4 show diagrammatically, alternative new arrangements of the construction of transformer windings;

FIG. 9 is a partial sectional view of a coil employing quadruple interleaving;

FIG. 10 is a partial sectional view of a portion of a winding employing multiple interleaving of parallel conductors;

Figure 1:
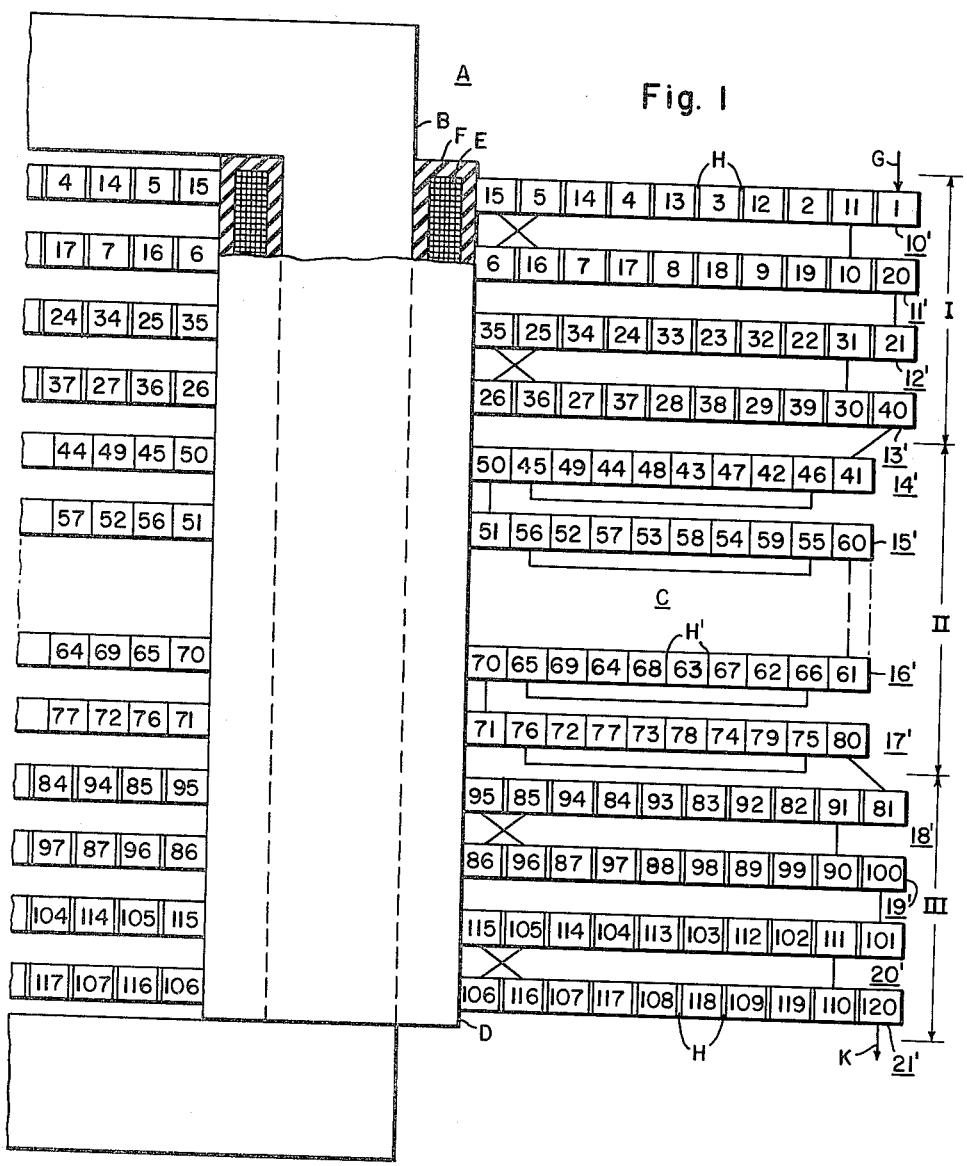
FIGURE 1 shows a partial sectional elevation of the core and windings of a transformer embodying the teachings of the invention.

Referring to FIG. 1 there is illustrated a portion of a transformer coil and core assembly A. The transformer core is composed of magnetic material and has a leg B. About leg B are positioned a primary or high voltage winding C and a secondary or low voltage winding D, which may be of any suitable conventional type and which may include a plurality of conductor turns E. In this embodiment of the invention, the windings C and D are disposed in substantially concentric relationship with respect to one another and are insulated from each other and from the core leg B by the electrically insulating material F.

The primary winding C comprises a plurality of disc type coils or annular winding section such as the winding sections 10' through 21'. It will be understood that these disc-type coils or annular winding sections may be referred to hereinafter as pancakes or pancake coils. The pancakes 10' through 21' are spaced apart axially from one another in a stacked arrangement and are connected in electrical series circuit relationship. The upper end of the high voltage winding C is connected to a primary terminal conductor G which, in turn, would normally be connected to one of the phases or lines of an electrical transmission system (not shown). The lower end K of the high voltage winding C would either be connected to ground or to the electrical transmission system.

The high voltage winding C is divided into three zones or sections I, II and III. The central section II is the largest of the three in this untapped embodiment of the invention. The outer sections I and III are of substantially equal size. The electrical insulation H used between the turns of sections I and III is thicker than the electrical insulation H' used between the turns of section II. Each of the pancakes of winding C comprises a plurality of turns of at least first and second conductors or conductor strands wound spirally together about the core leg B. The turns of the coil sections or pancakes are interleaved with one another in substantially the same plane. The degree of interleaving of the conductor turns in the central section II of the high voltage winding C is decreased over the degree of interleaving of the pancake conductors in sections I and III. This decrease in the degree of interleaving decreases the distributed series capacitance in the interior of the coil C to compensate for the increase in the series distributed capacitance in the interior of coil C caused by the thin insulation between turns in section II. It will be understood that a decrease in the degree of interleaving means a decrease in the number of turns connected in electrical series between physically adjacent turns. For example, in sections I and III the number of turns connected in series between adjacent turns is either nine or ten; in section II the number of turns connected in series between adjacent turns is either four or five.

It will be understood that more turns will be used in the pancakes of section II than in the pancakes of the other two sections although for simplicity all pancakes are illustrated with an equal number of turns.

The interleaving of conductors in sections I and III consists of interleaving the conductors of pairs of pancakes. For example, in pancakes 10' and 11' of section I which are interleaved together, the series electrical circuit starting from point G spirals inward toward the coil leg B to encompass turns 1, 2, 3, 4 and 5 of pancake 10'. The circuit then continues to turn 6 of pancake 11' where it spirals outward away from the core leg B through turns 7, 8, 9 and 10. The circuit now returns to pancake 10' at turn 11 and spirals inward through turns 12, 13, 14 and 15. Turn 15 is connected to turn 16 of pancake 11', the circuit now spirals outward away from core leg B through turns 17, 18, 19 and 20. The process of interleaving a pair of pancakes is now repeated at least once. For the number of turns used in the illustration, this method of interleaving produces nine or ten turns in electrical series between physically adjacent turns in coil sections I and III. It will be understood that this example is illustrative only and any even plurality of turns and pancakes may be used in sections I and III.

In section II the degree of interleaving is reduced by interleaving but one pancake at a time. For example, in pancake 14' starting at turn 41 the circuit spirals inward toward coil leg C through the turns 42, 43, 44 and 45. A connection is then made between turn 45 and turn 46 and the circuit again spirals inward toward core leg C through turns 47, 48, 49 and 50. This method of interleaving, which shall hereinafter be called single interleaving, is then repeated in the other pancakes of transformer section II. It will be noted that the number of turns and pancakes in section II may be varied by the designer to meet the requirements of the particular inductive apparatus. This method of interleaving produces four or five turns in series between the adjacent turns of the pancakes of section II for the number of turns used in the illustration.

Figure 2:
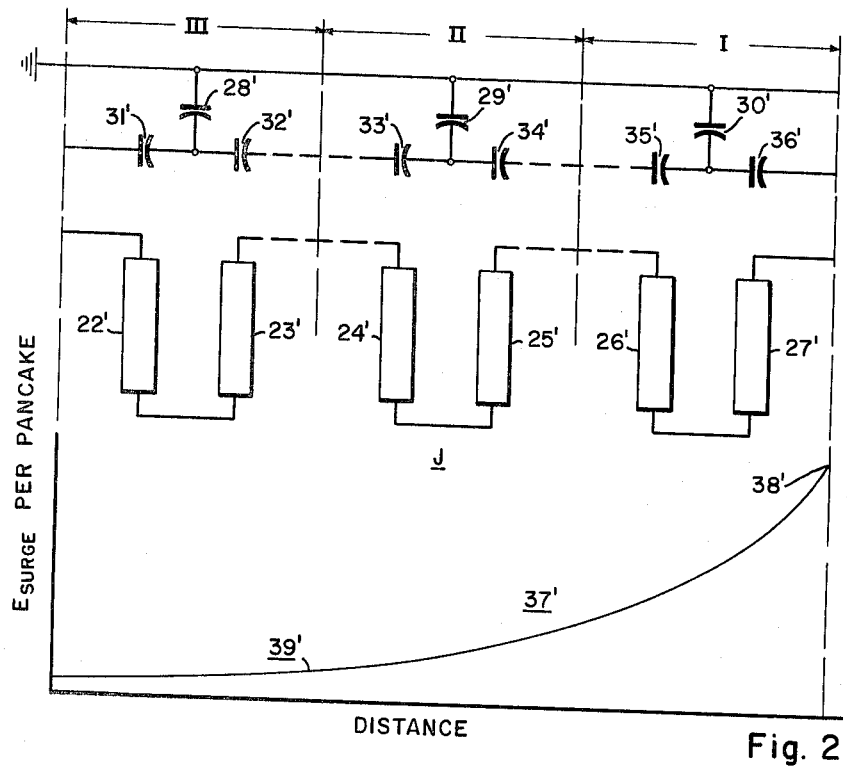
FIG. 2 shows a graph and diagrams illustrating the surge voltage and capacitance distribution in a transformer coil.

Referring to FIG. 2 there is illustrated a graph of the surge voltage distribution, and diagrams showing the distributed capacitances in a transformer coil employing the teachings of the invention.

In FIG. 2 there is illustrated a transformer coil J having three zones I, II, and III. Coil J is composed of a series of pancakes such as 22' through 27' connected in electrical series and interleaved throughout the three zones I, II, and III of coil J in accordance with the teachings of the invention. The insulation between the turns of coil J is graded, i.e., the turn-to-turn-insulation is thinner in zone II than in the other zones of the coil.

Capacitors 28′, 29, and 30′ represent the distributed shunt capacitances to ground of coil J and are of substantially equal size, if measured per pancake or per unit winding length. The overall shunt capacitance is relatively large and exists chiefly between winding elements and grounded elements of the transformer such as the iron core and the transformer tank (not shown). The surge voltage distribution in the coil J is determined by the ratio of ground capacitance to series capacitance. The higher this ratio the greater the unit voltage stress, therefore because the ground capacitance is relatively large, it is advisable to maximize the series capacitance of coil J. Capacitors 31′ through 36′ represent the distributed series capacitances of coil J and are of substantially equal size per pancake or per unit winding length because of the opposing effects on the series capacitance of zone II of reduced insulation and reduced degree of interleaving. The series capacitances originate between adjacent winding elements.

Curve 37′ represents the distribution of the surge voltage across the coil J plotted as voltage per pancake. It has been found that when a voltage surge first strikes a transformer winding, the capacitance of the winding rather than the inductance of the winding plays the predominant role in the distribution of the surge voltage across the winding. It is also well known that the surge voltage will also be distributed non-uniformly across the winding. It is to be noted that near point 38′ of curve 37′, which represents the line end of coil J, the surge voltage per pancake is high. Near point 39′ of curve 37′, which represents the interior of coil J, the surge voltage per pancake is low.

The series capacitance per unit length of the coil J remains relatively constant across the three zones because the capacitance of zone II is reduced due to the decrease in the degree of interleaving, and increased because of the closer turn spacing in zone II and the increased number of turns permitted in zone II by the thinner insulation. The net effect is to match the series capacitance per unit length of zone II to the series capacitance per unit length of the other two zones.

Referring to FIG. 3 there is illustrated another embodiment of the invention which has been built. For simplicity, the core leg and low voltage windings have not been shown. A partial sectional elevation is illustrated which displays the high voltage windings. It will be understood that the longitudinal axis of the core leg and low voltage winding is to the right of the FIGURES 3 through 7. The high voltage winding shown comprises a plurality of pancake coils 10′ through 21′. The pancake coils are connected in electrical series and are divided into three zones I, II, and III. The turn-to-turn insulation in zone II is less thick than the turn-to-turn insulation used in the other two zones. The pancakes of all zones are interleaved to present a high distributed series capacitance to surge voltages, the degree of interleaving is reduced in zone II to offset the increase in series distributed capacitance in zone II caused by the thinner turn-to-turn insulation used therein. It will be understood that more turns will be used in the pancakes of zone II than in the pancakes of the other two zones although for simplicity the pancakes of zone II are illustrated with only eleven turns.

The manner in which the turns of the pancakes of zones I and III are interleaved produces either four or five turns in electrical series between adjacent turns for the number of turns used in the illustration. For example, in pancake 10′ starting at turn 1, which would normally be connected to an external power circuit (not shown) by means of conductor L, the series electrical circuit would be traced spiralling to the right through turns 2, 3, 4 and 5. The circuit then returns to the left and again spirals to the right through turns 6, 7, 8, 9 and 10. This method of interleaving, which shall hereinafter be referred to as single interleaving, is used in all pancakes of zones I and III.

The degree of interleaving is reduced in zone II of FIG. 3 by a method of interleaving which shall be referred to hereinafter as double interleaving. In zone II only two or three turns are connected in electrical series between most adjacent turns for the number of turns used in the pancakes of FIG. 3. For example, in pancake 14′ the series electrical circuit is traced from the left of the winding starting at turn 41 and spiraling to the right through turns 42, 43 and 44 then back to turn 45. From turn 45 the series circuit again spirals to the right encompassing turns 46, 47, 48 and 49. The circuit then returns to turn 50 near the center of pancake 14′ and spirals once more to the right through conductor 51. The other pancakes of zone II are interleaved in like manner.

It will be understood that the number of pancakes and turns per pancake shown are merely illustrative and may be varied without departing from the spirit and scope of the invention. The series circuit through the winding ends at turn 124 of pancake 21′; turn 124 may then be connected to an external power network (not shown).

Referring to FIG. 4 there is illustrated a partial sectional view of another alternative embodiment of the invention. As in other embodiments of the invention a winding comprising a plurality of pancakes 10′ to 21′ is divided into three zones with a decrease in turn-to-turn insulation and degree of interleaving in the central zone. A partial view of a low voltage coil and core assembly Y is shown at the right of the figure.

The pancakes of zones I and III are interleaved singly as hereinbefore described in reference to zones I and III of FIG. 3. For the number of turns used in the illustration, single interleaving produces an average of 4.55 turns in electrical series between adjacent turns.

The pancakes of the central zone II are interleaved with a combination of single interleaving in one pancake and interleaving between pairs of pancakes. For example, in pancakes 16′ and 17′ tracing the series electrical circuit from the left or outer turn 61 of pancake 16′ the circuit spirals inward and to the right through turn 62 to turn 63 close to the center of pancake 16′. The series electrical circuit then returns to turn 64 near the outside of the pancake 16′ and again spirals inward or to the right through turns 65, 66 and 67. The circuit now continues to turn 68 of pancake 17′ where it spirals outward or to the left through turn 69 to a turn 70 near the center of pancake 17′. The circuit then returns to pancake 16′ at turn 71 near the center of pancake 16′. The circuit then spirals inward or to the right through turn 72 to turn 73 from which it returns to pancake 17′ at turn 74. The circuit now spirals outward or to the left through turns 75, 76 and 77. From turn 77 the circuit is connected to turn 78 near the center of pancake 17′ where it again spirals outward or to the left through turn 79 to turn 80. This method of interleaving is used in all pairs of pancakes of zone II. For the number of turns illustrated, this method of interleaving produces an average of 3.72 turns in electrical series between adjacent turns. This is a significant reduction in the degree of interleaving from the average of 4.55 turns in electrical series between adjacent turns in zones I and III.

Figure 5:
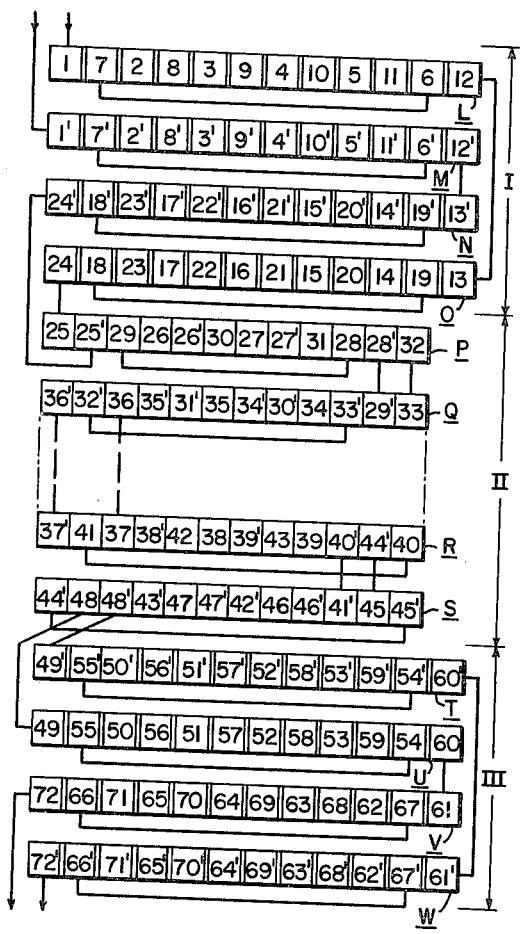
FIGS. 5 and 6 show diagrammatically, alternative new arrangements for winding a transformer coil with two conductors in parallel.
Figure 6:
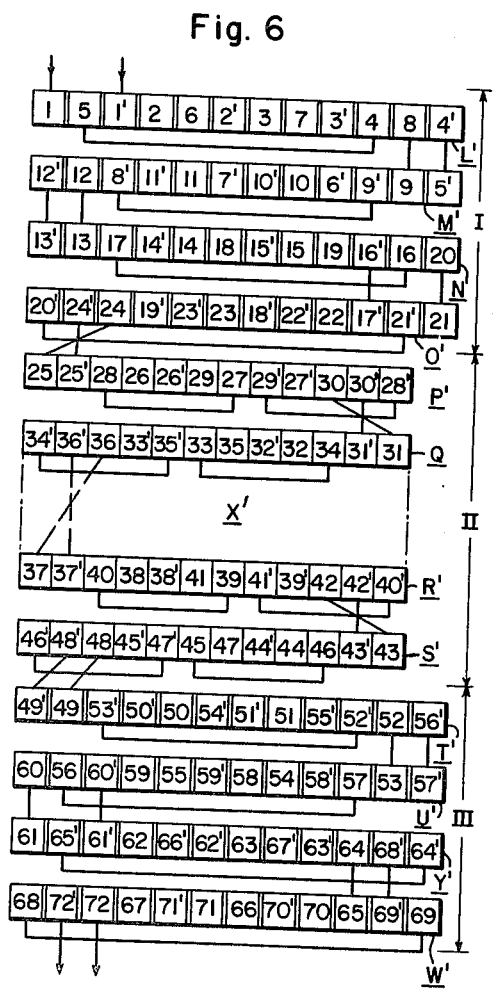

Referring to FIGS. 5 and 6 there are illustrated two embodiments of the invention which use two conductors in parallel for greater current carrying capacity.

In FIG. 5 there is illustrated a partial sectional view of a high voltage winding similar to those hereinbefore described in that it is composed of a plurality of interleaved pancakes L through W divided into three sections or zones I, II and III. The central zone II, as in the embodiments of the invention described previously, is wound with a reduced level of insulation and a reduced degree of interleaving.

The pancakes of zones I and III are interleaved singly as has been described in detail in the foregoing embodiments of the invention. With the number of turns used in FIG. 5 this results in an average of 5.5 turns in electrical series between adjacent turns in zones I and III. The pancakes of zones I and III are connected so that pairs of pancakes are connected in electrical parallel throughout the zones I and III. For example, in zone I pancakes L and M are in parallel as are pancakes N and O.

The line voltage is applied simultaneously to turns 1 and 1', and the other end of the high voltage winding is available for connection to an external circuit at turns 72 and 72'.

The pancakes of zone II of FIG. 5 are wound with two conductors in parallel in each pancake. In adjacent pancakes alternate conductors are single interleaved. The non-interleaved conductor passes but once through each pancake. For example, in pancake P one of the parallel conductors enters the pancake at turn 25 and then spirals to the right through turns 26, 27 and 28. The circuit then returns to turn 29 where it again spirals to the right through turns 30, 31 and 32. The other of the parallel conductors enters the pancake P at turn 25' and goes through the pancake but once through turns 26', 27' and 28'. From turns 28' and 32 the parallel circuit is connected to pancake Q at turns 29' and 33 where the interleaving process described in pancake P is repeated with the roles of the conductors interchanged. For example, the circuit bearing the prime superscripts now passes through the pancake Q twice through turns 29' and 36', and the parallel circuit starting at turn 33 passes but once through pancake Q by means of turns 33 to 36. This method of interleaving produces approximately four turns in electrical series between adjacent turns of the circuit bearing the prime superscripts and three turns in electrical series between adjacent turns for the circuit not bearing the prime superscripts for the number of conductors used in the illustration. Thus, in both of the circuits of zone II the degree of interleaving is reduced from the average of 5.5 turns in electrical series between adjacent turns of the parallel circuits of zones I and III.

Referring to FIG. 6 there is illustrated another partial sectional view of an embodiment of the invention comprising a high voltage winding X' having two circuits in parallel for greater current carrying capacity. One circuit is given prime superscripts throughout the winding. As in FIG. 5, the high voltage winding X' is composed of a plurality of interleaved pancakes L' through W' and is divided into three sections or zones I, II and III. The central zone II, as in other embodiments of the invention, is wound with both a reduced level of insulation and a reduced degree of interleaving.

The pancakes of zones I and III are interleaved with two conductors in parallel in each pancake. In adjacent pancakes alternate conductors are single interleaved. The non-interleaved conductor passes but once through each pancake. This method of interleaving is the same as that described in detail for zone II of FIG. 5 and hence will not be treated in detail again except to note that it produces three turns in electrical series between adjacent turns for the circuit bearing the prime superscripts and four turns in electrical series for the circuit without the superscripts for the number of turns used in the illustration.

The pancakes of zone II of FIG. 6 are also interleaved with two conductors in parallel in each pancake. The degree of interleaving in zone II is reduced from that of zones I and III by the use of double interleaving. For example, in pancake P' the circuit bearing the prime superscripts spirals to the right through the pancake once through turns 25', 26', 27' and 28'. The circuit then returns to turn 29' near the center of the pancake and again spirals to the right through turns 29' and 30' before going on to the next pancake. The circuit without the superscripts spirals to the right part-way through the pancake P' through turns 25, 26 and 27 and then returns to turn 28 from which it again spirals to the right through turns 29 and 30. From turn 30 the circuit is connected to the next pancake. In the other pancakes of zone II this double interleaving is repeated to produce two turns in electrical series between adjacent turns in the same circuit throughout the zone II for the number of turns used in the example. If greater current carrying capacity is desired, more than two conductors in parallel may be used.

Figure 7:
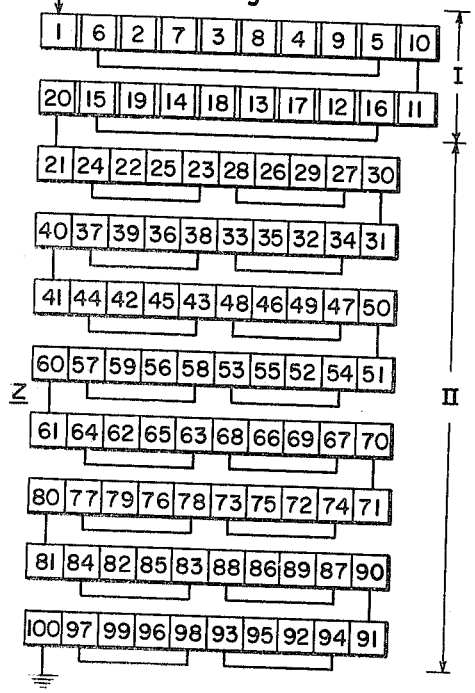
FIG. 7 is an embodiment of the invention designed for use in transformers which have one end of the winding at or near ground potential.

Referring to FIG. 7 there is shown an embodiment of the invention intended for use in directly or indirectly grounded electrical systems. An example of such a system would be a Y connected transformer with a grounded neutral. If one end of a transformer high voltage winding is to be grounded, the zone III which has been shown in FIGS. 4 through 6 is eliminated.

The embodiment of the invention illustrated by FIG. 7 comprises a high voltage winding Z; the winding Z is divided into two zones I and II. Zone I is single interleaved in the manner described in detail for zone I of FIG. 3. Zone II is interleaved doubly as described in detail for zone II of FIG. 3. The end of zone II, remote from zone I, is adapted to be connected to ground through any suitable means; therefore, any surge voltage must enter the winding Z through the fully insulated zone I and will attenuate rapidly before traversing zone II to reach ground. It will be understood that the insulation of zone II will be thinner than the insulation of zone I. There is no need of a zone III in this grounded embodiment of the invention as was used in FIG. 3 because any surge voltage wave must enter winding Z through zone I due to the grounding of the end of the winding Z remote from zone I.

It is to be noted that, while in all the foregoing embodiments of the invention one phase only of a transformer has been considered, the invention is equally applicable to multiphase transformers.

Figure 8:
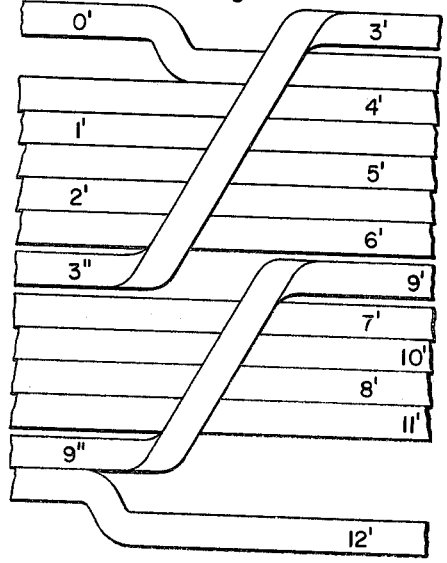
FIG. 8 is a partial elevation of one coil embodying multiple interleaving.

In FIG. 8 is a side view of one coil of a multiple interleaved disc-type winding illustrating how the physical connections are made. The series electrical circuit enters the disc-type coil at turn 0' in the upper left hand corner of the figure. The coil is wound initially with two conductors. The first conductor comprises turns 0', 1', 2', 3" (9'), 10', 11' and 12'. The second conductor comprises turns 3', 4', 5', 6', 7', 8' and 9". Turn 3" (9') is then cut and connected to turns 3' and 9" respectively. This results in an electric circuit that spirals downward substantially halfway through the coil by means of turns 0', 1', 2' and 3". The circuit then returns to the top or start of the coil and again spirals downward through the coil by means of turns 3', 4', 5', 6', 7', 8' and 9". The circuit now returns to turn 9' near the center of the coil and again spirals downward through the coil by means of turns 9', 10', 11' and 12'. Turn 12' may then be connected to the next coil of the winding. It will be understood that the number of turns used are merely illustrative. The general method of interconnecting the coil conductors as shown by this figure is used in all embodiments of the invention employing multiple interleaving. It will be noted that "turns" 3" and 9' are but different ends of one turn, as originally wound before cutting.

Referring to FIG. 9 there is illustrated a partial cross section of a pancake coil embodying the teachings of the invention in quadruple interleaved form. It will be understood that the axis of the coil is at the bottom of the figure, and is horizontal. The electric circuit enters the coil at turn 200 and spirals substantially one quarter way through the coil by means of turns 201, 202, and 203. Connection 225 connects turn 203 to turn 203' near the start of the coil. The electrical circuit now spirals through turns 204, 205, 206, 207 208 and 209 to a point near the center of the coil. Connection 226 connects the circuit to turn 209' and the circuit again spirals through the coil by means of turns 210, 211, 212, 213, 214 and 215. The circuit from turn 215' on is connected identically to the first half of the circuit described above with connections 227 and 228 being analogous to connections 225 and 226. From turn 224 the pancake coil may be connected to another pancake.

In FIG. 10 is illustrated one manner in which multiple interleaving may be adapted to conductors in parallel. A partial sectional view of two coils 230 and 232 of an inductive winding is illustrated. The coil axis is located at the bottom of the figure and is horizontal. Two conductors 234 and 236 enter the winding and are attached to coils 232 and 230 respectively. These coils are each doubly interleaved in the manner described for zone II of FIG. 7. The branch of the parallel circuit applied to coil 230 passes through turns 300 to 312. The other branch of the parallel circuit passes through coil 232 by means of turns 400 to 412. The parallel circuit may then be connected to additional coils by means of conductors 238 and 240. While only two conductors in parallel are shown, it will be understood that multiple interleaving may be applied to a plurality of conductors in parallel.

Figure 11:
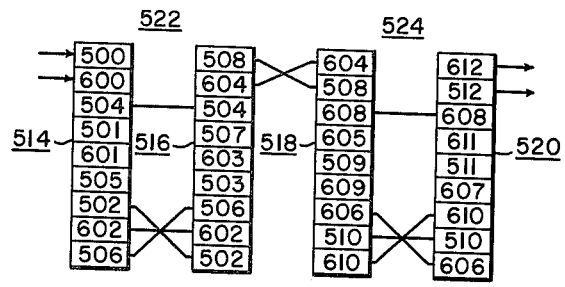
FIG. 11 is a partial sectional view of a winding suitable for use in some embodiments of the invention.

Referring to FIG. 11 there is illustrated another manner in which pancake coils may be wound and interleaved for use in the invention. This type of winding is especially adapted to high current applications. A partial sectional view of four disc-type coils 514, 516, 518 and 520 is shown. The common coil axis (not shown) is horizontal and is located below the figure.

Briefly, two parallel paths are formed through the windings by means of interleaving three conductors in each coil. Between adjacent coils, certain of the conductors are transposed so as to use two of the three conductors in alternate coil pairs for each of the parallel paths. Each of the parallel paths uses but one of the three conductors in the alternate coil pairs in which the other parallel path uses two of the three conductors; in this manner, the length of the parallel paths are equalized for balanced resistance and reactance.

It will be understood that the coils illustrated have only enough turns to show the principals of interleaving and interconnecting and that in practice many additional turns would be used.

The invention is illustrated by two coil pairs 522 and 524 comprised of pancake coils 514, 516 and 518, 520 respectively, although it will be understood that any even plurality of coil pairs may be used. Each coil may be considered to have been wound of three courses of three conductors each. Alternate coils are wound clockwise; the other coils are wound counterclockwise. The turns comprising the two parallel paths are numbered 500 to 512 and 600 to 612 respectively. In coil pair 522 the path bearing the 500 series numerals uses two of the three conductors in each coil while the parallel path bearing the 600 series numerals uses the remaining conductor. In coil pair 524 the paths bearing the 600 series numerals uses two of the three conductors in each coil while the parallel path bearing the 500 series numerals uses the ramaining conductor.

The 500 series circuit enters the winding at turn 500 of coil 514 in coil pair 522 and spirals toward the coil axis by means of one of the three coil 514 conductors comprising turns 501 and 502. The 500 series circuit then is connected to coil 516 where it spirals away from the coil axis through turns 503 and 504 comprising one of the three conductors of coil 516. The circuit returns to coil 514 where it is connected to another of the three conductors of coil 514 and again passes through coil 514 by means of turns 505 and 506. The 500 series circuit is then again connected to coil 516 where it spirals away from the coil axis by means of a second conductor of coil 516 which appears at turns 507 and 508. The circuit is then connected to coil 518 of coil pair 524 where it spirals but once toward the coil axis by means of the conductor which appears at turns 509 and 510. Now the circuit connects to coil 520 where it spirals but once away from the coil axis, through the conductor which appears at turns 511 and 512. From turn 512 the 500 series circuit may be connected to additional winding elements.

The 600 series circuit forms a parallel path to the 500 series circuit. The circuit bearing the 600 series of numerals enters coil pair 522 at turn 600 of coil 514, it then spirals toward the coil axis by means of the conductor in coil 514 not used by the 500 series circuit, appearing at turns 601 and 602. The 600 series circuit is connected to coil 516 where it spirals away from the coil axis through the conductor of coil 516 not used by the circuit bearing the 500 series of numerals appearing at turns 603 and 604. From turn 604 of coil pair 522 the 600 series circuit is connected to coil pair 524 where it passes twice through each coil of the pair appearing at turns 605 to 612. The manner in which the 600 series circuit passes twice through each coil of coil pair 524 is exactly the same as the manner in which the 500 series circuit passes twice through each coil of coil pair 522 and hence will not be considered further. From turn 612 the 600 series circuit may be connected to additional winding elements.

Figure 12:
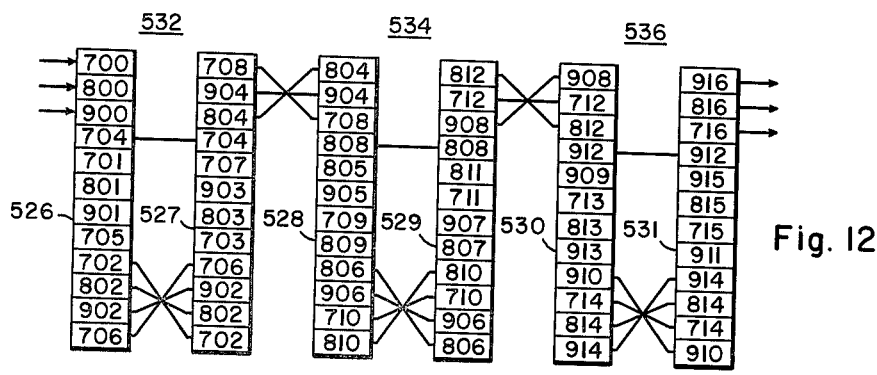
FIG. 12 is a partial sectional view of another winding suitable for use in high current embodiments of the invention.

In FIG. 12 there is illustrated yet another manner in which dics type coils may be wound and interleaved for use in the invention. This type of winding is adapted to carrrying higher currents than the one illustrated in FIG. 11. A partial sectional view of six disc-type coils 526 through 531 is shown. The common coil axis (not shown) is horizontal and is located below the figure.

Briefly, three parallel paths are formed through the windings by means of interleaving four conductors in each coil and interconnecting coils in groups of six. In successive coil pairs one of each of the three parallel conductor paths passes twice through each of the coils of the coil pair. This uses the "extra" conductor of the four conductors in each coil. In this manner, the lengths of the parallel paths are equalized over the winding for balanced resistance and reactance.

It will be understood that the coils illustrated have only enough turns to show the principles of interleaving and interconnecting and that in practice many additional turns would be used. The invention is illustrated by three coil pairs 532, 534 and 536 although it will be understood that any multiple of three coil pairs may be used. Each coil may be considered to have been wound of three courses of four conductors each. Alternate coils are wound clockwise, the other coils being wound counterclockwise. The turns comprising the three parallel paths are numbered 700 to 716, 800 to 816 and 900 to 916, respectively. In coil pair 532 the circuit bearing the 700 series of numerals passes twice through each of the coils 526 and 527. In coil pair 534 the circuit bearing the 800 series of numerals passes twice through each of the coils 528 and 529. In coil pair 536 the circuit bearing the 900 series numerals passes twice through each of the coils 530 and 531.

It will be understood that the successive coils and coil pairs are interconnected by transpositions so as to minimize circulating currents in the overall winding.

The 700 series circuit enters the winding at turn 700 of coil 526 in coil pair 532; the circuit spirals inward toward the coil axis by means of turns 701 and 702. Turn 702 is connected to coil 527 of coil group 532. In coil 527 the circuit spirals outward away from the coil axis, appearing at turns 703 and 704. From turn 704 of coil 527 the circuit returns to coil 526 where it again spirals inward toward the coil axis by means of turns 705 and 706. From turn 706 of coil 526 the circuit again goes to coil 527 where it spirals outward away from the coil axis and appears at turns 707 and 708. From turn 708 of coil 527 the circuit continues to coil 528 of coil pair 534 where it spirals inward towards the coil axis but once appearing at turns 709 and 710. From turn 710 of coil 528 the circuit continues to coil 529 where it spirals only once outward away from the coil axis by means of turns 711 and 712. The circuit then connects to coil 530 of coil pair 536 where it spirals once inward toward the coil axis by means of turns 713 and 714. From turn 714 of coil 530 the circuit continues to coil 531 where it spirals once outward away from the coil axis and appears at turns 715 and 716. From turn 716 the 700 series circuit may be connected to additional winding elements or to an electric line.

The 800 series circuit traverses the winding in a similar manner with the exception that it passes twice through the coils 528 and 529 which form coil pair 534 and once through the other coils. The 800 series circuit enters the winding at turn 800 of coil 526 of coil pair 532 and spirals inward toward the coil axis appearing at every fourth turn, i.e. turns 801 and 802. The circuit then is connected to coil 527 where it spirals outward away from the coil axis appearing at turns 803 and 804. The circuit is then connected to coil pair 534 where the circuit passes twice through each of the coils of the pair in a manner identical to the way the 700 series circuit passes twice through each of the coils of coil pair 532. The 800 series circuit passes the first time through coil 528 appearing at conductors 805 and 806; the circuit then connects to coil 529 where it passes through coil 529 the first time appearing at turns 807 and 808. The circuit returns to coil 528 and passes for the second time through coil 528 appearing at turns 809 and 810; from turn 810 of coil 528 the circuit is connected again to coil 529 where it passes through coil 529 for the second time appearing at conductors 811 and 812. The circuit is then connected to coil 530 of coil pair 536 and passes through this coil but once appearing at turns 813 and 814; the circuit is then connected to coil 531 and passes but once through the coil 531 spiraling outward from the coil axis and appearing at turns 815 and 816. From turn 816 the 800 series circuit may be connected to additional winding elements or to an electric line.

The 900 series circuit passes through the winding in a manner similar to that hereinbefore described for the 700 and 800 series circuits. The 900 series circuit passes through the coils of coil pairs 532 and 534 only once and passes through each coil of coil pair 536 twice. The 900 series circuit is in electrical parallel with the hereinbefore described 700 and 800 series circuits. The 900 series circuit enters the winding at turn 900 of coil 526 in the coil pair 532. The circuit spirals inward toward the coil axis appearing at every fourth turn, i.e. turns 901 and 902. The circuit is then connected to coil 527 of coil pair 532 where it spirals outward away from the coil axis apearing at turns 903 and 904. From turn 904 of coil 527 the circuit is connected to coil 528 of coil pair 534 where it spirals once through the coil appearing at turns 905 and 906 as it proceeds inward toward the coil axis. The circuit is then connected to coil 529 where it spirals outward away from the coil axis appearing at conductors 907 and 908; from turn 908 of coil 529 the 900 series circuit is connected to coil pair 536 where it twice passes through each coil of the coil group substantially in the manner as hereinbefore described with reference to the 700 series circuit and the 800 series circuit. The circuit passes through coil 530 of coil group 536 for the first time appearing at every fourth turn which in this case would be turns 909 and 910; the circuit is then connected to coil 531 of coil pair 536 where it passes through the coil the first time spiraling away from the coil axis by means of turns 911 and 912. The circuit then returns to coil 530 of coil pair 536 where it spirals inward toward the coil axis for the second time appearing at turns 913 and 914; the circuit then returns to coil 531 where it spirals outward away from the coil axis for the second time appearing at turns 915 and 916. From turn 916 the 900 series circuit may be connected to additional winding elements or to an electric line.

It will be understood that in a winding employing a multiple of the six coils illustrated in FIG. 12 that each group of six coils will be interleaved in the manner described for coils 526 through 531.

It will be understood in all of the foregoing embodiments of the invention that only a radial section through one side of the winding is shown. It will be further understood that a core leg and a low voltage winding, although not shown in each figure, are located to the right of each of the FIGS. 3 through 7 as illustrated by FIG. 4. A core leg and low voltage winding will also be understood to be located at the bottom of FIGS. 9 and 10. The number of pancakes and pancake turns illustrated in each figure are limited for the sake of simplicity and a greater number of pancakes and pancake turns may be used. Zone II in particular, may in any three zone embodiment of the invention have more turns per pancake than the pancakes of zones I and III due to the thinner insulation used between turns in the pancake of zone II. It is to be noted that zone II, in many embodiments of the invention, will be larger than zones I and III so as to achieve a high overall space factor and maximum economy of insulation.

It will, therefore, be apparent that there has been disclosed a method of interleaving the high voltage winding of a transformer and grading the insulation in such a winding so that a high distributed series capacitance is presented to surge voltages. The distributed series capacitance per unit length is kept substantially constant throughout the winding. The teachings of the invention also results in a winding that has a higher space factor.

Since numerous changes may be made in the above-described apparatus and different embodiments may be made without departing from the spirit thereof, it is intended that all the matter contained in the foregoing description or shown in the accompanying drawings shall be interpreted as illustrative and not in a limiting sense.

I claim as my invention:

1. A winding for electrical inductive apparatus comprising a plurality of coils connected in electrical series, said coils each comprising a plurality of insulated conductor turns, said winding being divided into a plurality of zones spaced along the longitudinal axis of said winding, the conductor turns in said zones being interleaved to connect a plurality of conductor turns in electrical series between physically adjacent conductor turns, a central zone of said winding having a reduced thickness of turn-to-turn insulation compared to the insulation used between turns in the other zones of said winding, said central zone having a degree of interleaving that places fewer conductor turns in electrical series between physically adjacent conductor turns than in the other zones of said winding, said other zones being identically interleaved.

2. A winding for electrical inductive apparatus comprising a plurality of disc-type coils, said disc-type coils each comprising a plurality of insulated conductor turns, said winding being divided into a plurality of zones spaced along the longitudinal axis of said winding, the conductor turns of said coils being interleaved to produce a plurality of conductor turns in electrical series between physically adjacent conductor turns, the coils of a central zone of said winding being single interleaved by winding each of said coils of a first and second conductor spirally together and then electrically interconnecting said conductors between the last turn of the first conductor and the first turn of the second conductor, the coils of the other zones of said winding being interleaved by winding each coil with a first and second conductor spirally together and then electrically interconnecting alternate coils between the second conductor of one coil and the first conductor of the adjacent coil on the inside of said winding and the second conductor of the one coil to the second conductor of the adjacent coil and the first conductor of one coil to the first conductor of the adjacent coil on the outside of said winding, the insulation between the conductor turns in the central single interleaved zone of said winding being reduced in thickness as compared to the insulation between conductor turns in the remaining zones of said winding.

3. A winding for an electrical transformer comprising a plurality of pancake coils connected in electrical series, said pancake coils each comprising a plurality of insulated conductor turns, the conductor turns in each of said pancake coils being interleaved to produce a plurality of conductor turns in electrical series between physically adjacent conductor turns, said pancake coils being divided into a plurality of zones spaced along the longitudinal axis of said winding, a central zone of said plurality of zones having conductor turns separated by insulation reduced in thickness as compared to the insulation used between conductor turns in the other zones, the central zone of said winding being interleaved to provide fewer conductor turns in electrical series between physically adjacent conductor turns than in the other zones of said winding, said interleaving in the central zone comprising multiple interleaving in each pancake by winding each pancake with two conductors and interconnecting said conductors so that the series circuit through each pancake goes substantially halfway through the pancake by means of every other turn and returns to the start of the pancake and goes completely through the pancake by means of every other turn and returns to a point near the center of the pancake and passes through the second half of the pancake by means of every other turn; said interleaving of the pancakes in the other zones comprising single interleaving in each pancake by means of winding each pancake in said zones with a first and second conductor and then interconnecting said conductors between the last turn of the first conductor and the first turn of the second conductor in all pancakes in said zones.

4. In a winding for electrical inductive apparatus comprising a plurality of separate coils connected in electrical series, said coils each comprising a plurality of conductor turns separated by electrical insulation; the combination of interleaving of the conductor turns of said coils by connecting a number of conductor turns in electrical series between physically adjacent conductor turns, the division of said winding into three zones spaced along the longitudinal axis of said winding, the reduction of the turn-to-turn insulation thickness in the central zone of said three zones below the thickness of the turn-to-turn insulation used in the other two zones of said winding, and the reduction of the degree of interleaving in said central zone compared to the degree of interleaving of the other two zones by connecting a fewer number of conductor turns in electrical series between physically adjacent conductor turns than in the other two zones of said windings; said interleaving of the conductor turns in the central zone comprising the interconnection of pairs of adjacent coils by winding each coil with a first and a second conductor spirally together and then interconnecting the conductors of each coil pair so that an electrical circuit is connected through the first coil of each coil pair by means of alternate conductor turns to a point near the center of said coil, then returns to the start of said coil from which it passes through the entire coil by means of alternate conductor turns, goes to the second coil and continues to a point near the center of said second coil by means of alternate conductor turns, returns to the first coil at a point close to the mid-point of said coil and threads through the last half of said first coil by means of alternate conductor turns, returns to the second coil and passes completely through said second coil by means of alternate conductor turns, returns to a turn essentially at the mid-point of the second coil, goes through the last half of the second coil by means of alternate conductor turns, and connects to the next pair of coils where the interleaving process is repeated; the two outer zones of said winding being single interleaved by means of winding each coil with a first and second conductor spirally together and then interconnecting said conductors between the last turn of the first conductor and the first turn of the second conductor.

5. In a winding for an electrical transformer comprising a plurality of interleaved and insulated conductor turns arranged in discrete coils connected in electrical series; the combination of parallel connected conductors, graded turn-to-turn insulation, and graded interleaving of conductor turns; said parallel connected conductors being two in number, said turn-to-turn insulation being graded by dividing said winding into three zones along the longitudinal axis of said winding and reducing the turn-to-turn insulation thickness in the central zone as compared to the turn-to-turn insulation thickness in the two end zones; said graded interleaving of conductor turns being achieved by placing a fewer number of conductor turns in electrical series between physically adjacent conductor turns in the central zone of said winding than in the two end zones by constructing the central zone of said winding of discrete coils with three conductors wound simultaneously and then interconnecting said conductors so that two parallel paths are produced through each coil, the first parallel path through each coil being by way of the first conductor appearing at every third conductor turn, then back to a point near the start of each coil and again through each coil by means of the second conductor appearing at every third conductor turn, the second parallel path through each coil being by way of the third conductor passing but once through each coil and appearing at every third conductor turn, all coils of the central zone being similarly interleaved with the conductor which passes through the coil but once being alternated between the parallel paths in successive coils to keep the parallel circuits of equal length, the other two zones of said winding having groups of two successive coils connected in parallel, each coil in said zones being single interleaved by means of winding each coil with a first and second conductor simultaneously and then interconnecting the last turn of the first conductor and the first turn of the second conductor.

6. An electrical inductive apparatus comprising a magnetic core, a winding disposed on said core, said winding comprising a plurality of disc-type coils connected in electrical series, each of said coils including a plurality of insulated conductor turns produced by winding three conductors spirally together in the same direction about a portion of said core, successive coils being wound in opposite directions outwardly from the intermost turn, said winding being divided into three zones along the longitudinal axis of said winding with the insulation between the turns in the central zone being less thick than the insulation between the turns in the two end zones, said coils in said central zone being interleaved to produce a plurality of conductor turns in electrical series between physically adjacent conductor turns by means of interconnecting the three conductors in each coil so that there are two parallel paths through each coil, the first parallel path going essentially halfway through the coil by means of the second conductor appearing at every third turn, then returning to the start of the first conductor where it goes completely through the coil appearing at every third turn, the second parallel path being through the coil by means of the third conductor, then back to a point near the mid-point of the coil and through the remaining half of the coil by means of the second half of the second conductor, the two end zones of said winding being interleaved by winding each coil with three conductors spirally together in the same direction about a portion of said core, and interconnecting the three conductors so that two parallel paths are produced through each coil, a first path being through the coil by means of the first conductor appearing at every third turn, then back to a point near the start of the coil and again through the coil by means of the second conductor appearing at every third turn, the second parallel path through the coil being by way of the third conductor passing but once through the coil and appearing at every third turn, the other coils of the two end zones being similarly interleaved with the conductor which passes through the coil but once being alternated between the two parallel paths in successive coils to keep the parallel circuits of equal length.

7. A winding for stationary electrical inductive apparatus comprising a plurality of coils connected in electrical series, said coils each comprising a plurality of insulated conductor turns, said coils being divided into two zones along the longitudinal axis of said winding, one of said zones having turn-to-turn insulation that is thicker than the turn-to-turn insulation used in the other zone, the conductor turns of said coils being interleaved to provide a plurality of serially connected turns between physically adjacent turns, the conductor turns of the coils of the zone which has the thicker turn-to-turn insulation having more conductor turns connected in electrical series between physically adjacent conductor turns than in the other zone of said winding, and means for connecting the zone which has the thinner turn-to-turn insulation to ground.

8. A winding for an electrical transformer comprising a plurality of stacked pancake coils connected in electrical series, said pancake coils being divided into first and second zones along the longitudinal axis of said winding, the first zone of said winding having insulation between turns which is thicker than the insulation between turns in the second zone of said winding, the coils of the first zone each comprising two conductors spirally wound together in the same direction and interconnected so that the last turn of the first conductor and the first turn of the second conductor are in electrical series, the coils of the second zone each being spirally wound with two conductors which are interconnected to form a series circuit which goes through the coil substantially halfway by means of the first conductor, returns to the start of the second conductor and goes completely through the coil by means of the second conductor, returns to a point near the center of the coil and passes through the second half of the first conductor, and means for connecting the second zone to ground.

9. A winding for electrical inductive apparatus comprising a plurality of interleaved coils, each of said coils comprising a plurality of turns of at least one insulated electrical conductor, the turns of said coils being interleaved to connect a plurality of turns in electrical series between physically adjacent turns, said coils being divided into zones the turn-to-turn insulation in at least one of said zones having a reduced thickness compared to the thickness of the turn-to-turn insulation in at least one other zone, the zone with the reduced thickness of turn-to-turn insulation also having a reduced degree of interleaving compared to at least one other zone, said reduced degree of interleaving being achieved by placing fewer turns in electrical series between physically adjacent turns in the zone with the reduced thickness of turn-to-turn insulation than in at least one other zone, and means for connecting the zone with the reduced thickness of turn-to-turn insulation to ground.

10. A winding for electrical inductive apparatus comprising a plurality of electrically connected pancake coils each having at least one electrically insulated conductor arranged to provide a plurality of electrically insulated turns, said pancake coils being divided into at least two serially connected zones, the insulation between the turns of the pancake coils in one of the zones being thinner than the insulation between the turns of the pancake coils in the remaining zones, the turns of the pancake coils in each of the zones being interleaved to connect a plurality of turns in series between physically adjacent turns, the turns of the pancake coils in the zone which has the thinner insulation being interleaved to provide fewer series connected turns between physically adjacent turns than the interleaving in the remaining zones, to offset the increase in series capacitance due to the thinner insulation between turns and provide a minimum variation in series compacitance across the winding, and means for connecting the zone having the thinner insulation between the turns to ground.

References Cited by the Examiner

FOREIGN PATENTS 929,722 6/1963 Great Britain.

ROBERT K. SCHAFER, *Primary Examiner.*

JOHN F. BURNS, *Examiner.*

T. J. KOZMA, *Assistant Examiner.*